(12) United States Patent
Twardawski et al.

(10) Patent No.: US 7,025,387 B2
(45) Date of Patent: Apr. 11, 2006

(54) LOCKING PLUG-IN CONNECTION DEVICE

(75) Inventors: Harald Twardawski, Rastatt (DE);
Thomas Luft, Karlsruhe (DE); Bernd Halbrock, Konigsbach-Stein (DE);
Michael Markus Huck, Buhlertal (DE)

(73) Assignee: Eaton Fluid Power GmbH, Baden Baden (DE)

( * ) Notice: Subject to any disclaimer, the term of this patent is extended or adjusted under 35 U.S.C. 154(b) by 0 days.

(21) Appl. No.: 10/466,515

(22) PCT Filed: Jan. 8, 2002

(86) PCT No.: PCT/DE02/00024

§ 371 (c)(1),
(2), (4) Date: Nov. 24, 2003

(87) PCT Pub. No.: WO02/057679

PCT Pub. Date: Jul. 25, 2002

(65) Prior Publication Data

US 2004/0094952 A1    May 20, 2004

(30) Foreign Application Priority Data

Jan. 19, 2001    (DE) ................................ 101 02 230

(51) Int. Cl.
*F16L 27/00*    (2006.01)

(52) U.S. Cl. ................. 285/136.1; 285/921; 285/140.1; 285/414

(58) Field of Classification Search .................. 285/23, 285/136.1, 137.11, 139.1–139.3, 140.1, 141, 285/203, 921, 208–210, 193, 205, 206, 414, 285/415, FOR 140, FOR 141, FOR 143, 285/FOR 144, 423, 422; 403/240, 243, 263
See application file for complete search history.

(56) References Cited

U.S. PATENT DOCUMENTS

| 1,659,094 A | | 2/1928 | Godfrey |
| 2,472,569 A | * | 6/1949 | Caldwell et al. ............. 285/210 |
| 4,441,744 A | * | 4/1984 | Oostenbrink et al. ..... 285/140.1 |
| 4,494,779 A | * | 1/1985 | Neff et al. ................... 285/921 |
| 4,998,938 A | * | 3/1991 | Ghajar et al. ................ 285/206 |

(Continued)

FOREIGN PATENT DOCUMENTS

DE    84 24 892.0    9/1990

(Continued)

OTHER PUBLICATIONS

Derwent English Abstracts for FR 2 772 875—A1 and DE 43 25 420 A1###.
Deutsches Patent- und Markenamt for DE 84 24 892.0.

*Primary Examiner*—Aaron Dunwoody
(74) *Attorney, Agent, or Firm*—Honigman Miller Schwartz and Cohn LLP

(57) ABSTRACT

The connection device (101, 201) according to the invention has a locking head (109, 209) that can be locked to an opening (8) of a container wall (3). A clamping device (123, 223) is also provided on the corresponding coupling piece (5), which serves to tighten the head (109, 209) locked to the container wall (3) without a rotational movement against the container wall (3). The clamping device (123, 223) can be designed as a wedge-clamping device (142, 242). The latter permits generation of large clamping forces with small operating forces. The clamping device (142, 242) is preferably secured by a locking device (253), so that vibration-proof connection resistant to temperature changes is achieved during simple assembly.

4 Claims, 4 Drawing Sheets

U.S. PATENT DOCUMENTS

| | | | | |
|---|---|---|---|---|
| 5,068,496 A | * | 11/1991 | Favalora | 285/921 |
| 5,204,499 A | * | 4/1993 | Favalora | 285/921 |
| 5,667,257 A | * | 9/1997 | Butler et al. | 285/921 |
| 5,857,800 A | * | 1/1999 | Nell | 403/263 |

FOREIGN PATENT DOCUMENTS

| | | |
|---|---|---|
| DE | 43 25 420 A1 | 2/1995 |
| FR | 2 772 875 A1 | 6/1999 |

* cited by examiner

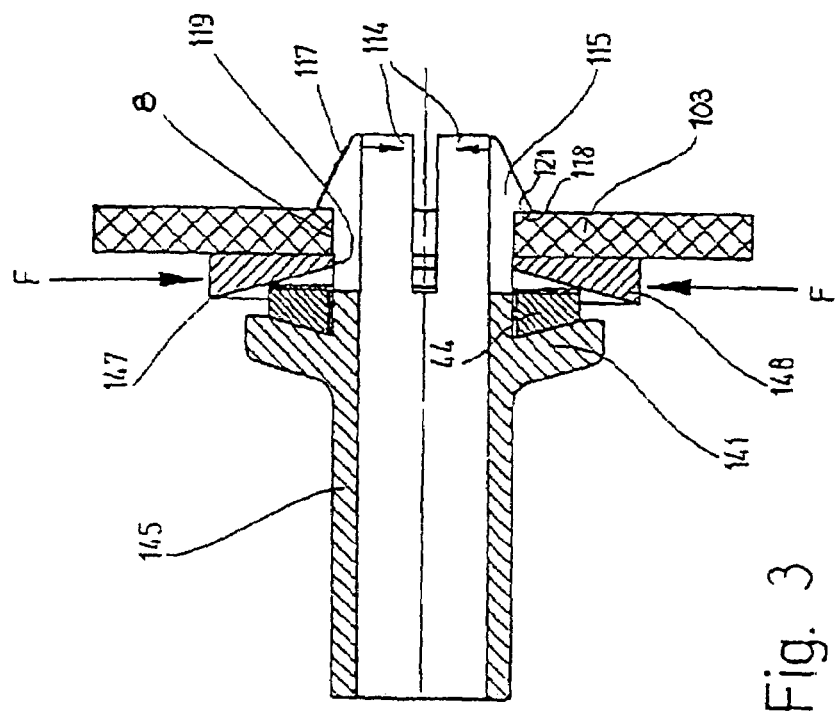
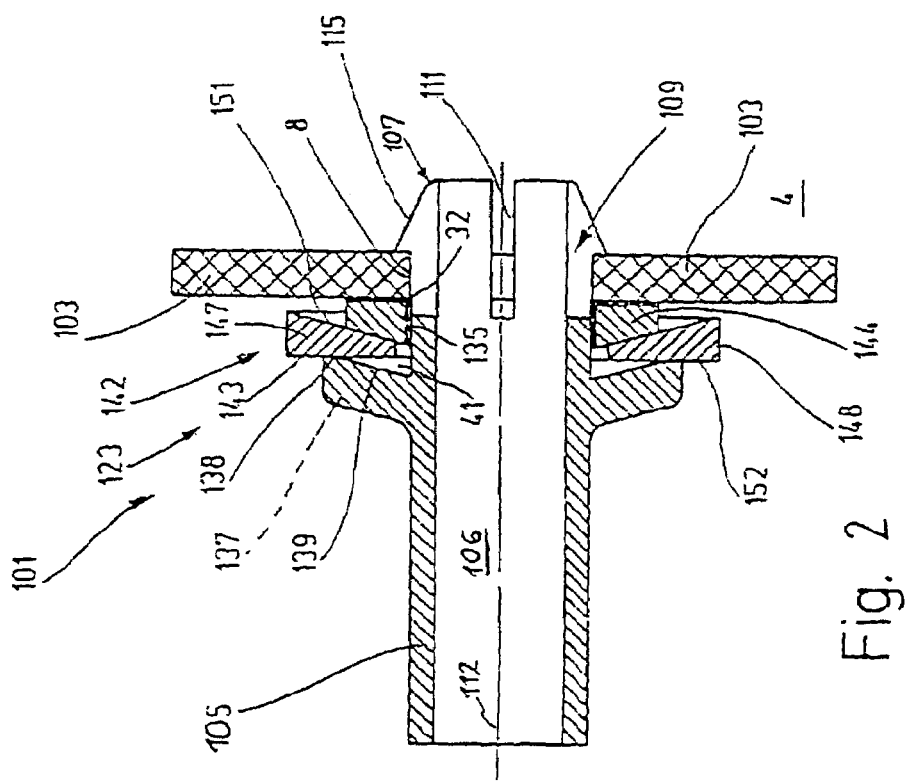
Fig. 3
Fig. 2

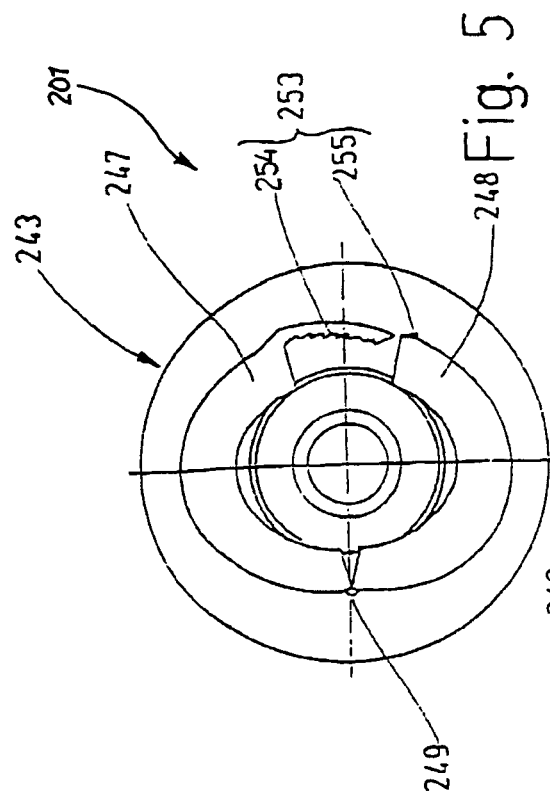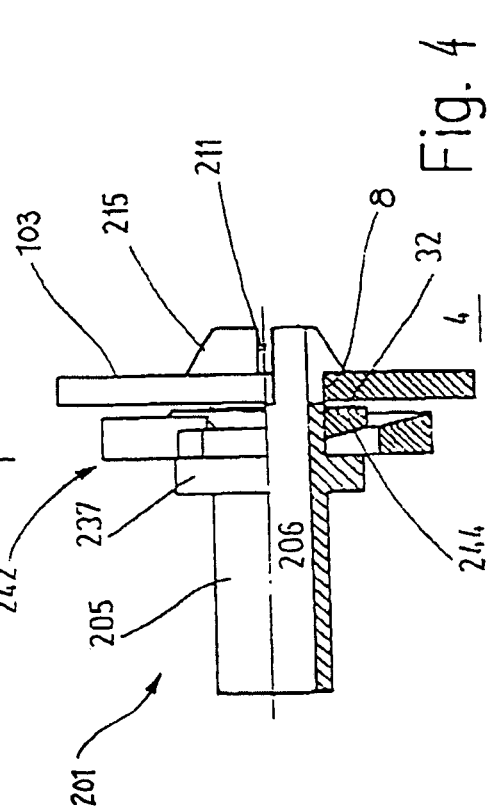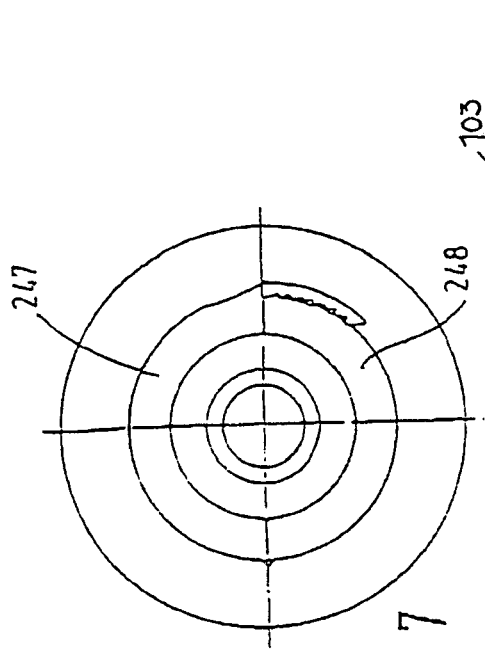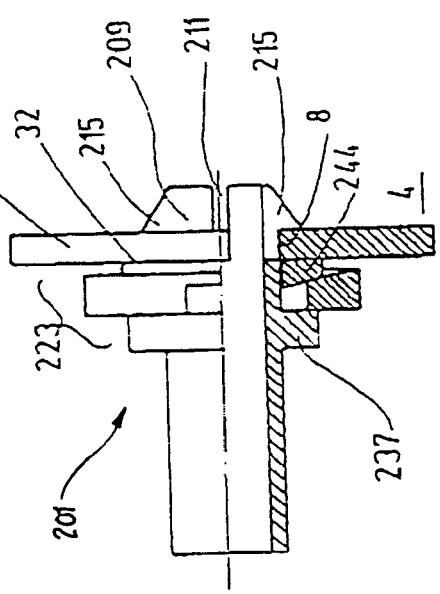

LOCKING PLUG-IN CONNECTION DEVICE

BACKGROUND OF THE INVENTION

1. Field of the Invention

The invention concerns a connection device for fluid-conducting devices, especially for tank connections.

2. Description of the Related Art

Especially in automotive technology, it is often desirable to provide tanks or other fluid-conducting devices with a connection, in order to connect a pipe or hose or other lines. Such connections must be permanently tight and insensitive to mechanical and climatic effects. In particular, the connections must be vibration-proof. Moreover, simple and reliable assembly is generally desired. The connection devices should generally be additionally setup both for mechanical assembly and manual assembly, in order to permit, on the one hand, rapid and reliable assembly during manufacture of the vehicle, and, on the other hand, to permit regular maintenance, which is generally conducted by hand.

In some cases, it is also desirable to be able to loosen the connection.

A connection device for fluid lines on pump housings is known from DE 198 27 701 A1. An angled tube piece with locking fingers formed on the end is part of the connection device. The outer peripheral surface of the connection piece connected to the locking fingers carries a sealing element, like an O-ring. To establish the rotational position and to support lateral bending moments, the connection piece has arms extending radially away from it, which are provided with teeth on the side facing the pump housing. A toothed ring is provided between these arms and the pump housing, which, when the tube end is inserted into an opening of the pump housing, engages with the teeth of the arms.

A connection piece made of elastic material is also known from FR 2772875. The connection piece is designed tubular and has an end with a bulge-like thickening provided with a stiffening ring. A collar-like flange is provided at a distance I to the bulge-like thickened end. If the connection piece is inserted into the opening of a vessel wall, it is accommodated between the bulge-like thickening and the flange. A locking ring serves to fasten the connection piece, which is pushed axially onto the connection piece and tightens the flexible flange against the vessel wall.

With this as point of departure, a need exists for a connection device for fluid-conducting equipment that permits rapid, reliable and tight connection between a line end and a fluid-conducting device, like a tank.

SUMMARY OF THE INVENTION

The connection device according to the present invention has a coupling piece that is passed through by a fluid channel and can be inserted with one end into an opening of a fluid-conducting device. The end of the coupling piece is provided with means of locking. The means of locking are designed so that they snap into or behind the opening, into which the coupling piece is inserted. The means of locking therefore secure the axial position of the coupling piece in one direction. For axially complete securing and clamping of the means of locking against the corresponding abutment on the fluid-conducting device, a clamping device is used. A sealing element arranged between the locking device and the clamping device serves to seal the coupling piece relative to the fluid-conducting device.

A connection can be produced with this connection device in a two-step process, initially snapping (inserting) the coupling into an opening and then securing the clamping device. Because of this, the coupling piece is locked onto the fluid-conducting device, for example, onto a vessel wall. The connection is tilt-proof and vibration-proof. The sealing element is axially clamped. To produce the connection, no screwing or rotational movement is required.

The coupling piece can have a tubular base element that can be flexibly deformed radially inward on its end. Such deformability can be achieved by one or more, for example, strip-like regions extending in the axial direction, being less rigid in its sections of the wall in the peripheral direction than the other wall sections. Such regions can be formed, for example, by longitudinal slips or strip-like weakening zones or a combination of the two. The finger-like wall sections between the slits or weakening zones, which are flexible and therefore have a spring effect, are then exposed.

Locking recesses or locking protrusions that form locking devices with the flexible wall regions of the coupling piece can be formed on the free ends of such fingers. The locking protrusions extend radially from the coupling piece and have an introduction slope on the side lying in front of the insertion direction and a locking or support surface on their side lying behind the insertion direction. This locking or support surface is preferably oriented radially, so that a flat contact is achieved between the container wall surrounding the insertion hole and the locking or contact surface. If necessary, the locking or contact surface can also be sloped at an angle relative to the radial direction, so that only a linear contact occurs with the container wall. However, in each case, it is considered advantageous in most variants to abruptly reduce the diameter of the coupling piece from the rear end of the locking protrusion to the coupling piece. This prevents the coupling piece from being pulled out from the opening by large axial forces.

The locking device, when locked to the vessel wall, is clamped against it by the clamping device. An abutment formed on the coupling piece preferably belongs to the clamping device. In one variant of the connection device according to the invention, the clamping device is designed as a wedge-clamping device. The abutment provided on the coupling piece is then formed, for example, by a disk-like flange, on which a straight or arc-shaped wedge is supported. This presses directly against the vessel wall or indirectly by an intermediate piece and therefore clamps the locking device against the vessel wall. The operating device to produce the clamping force is directed across the axial direction.

The wedge elements of the wedge-clamping device are preferably designed asymmetric, i.e., the end surfaces (the surfaces pointing in the axial direction) are sloped at different angles relative to the radial direction. This makes it possible, especially combined with an intermediate piece (retaining ring) to achieve a greater or more limited axial elongation in such a configuration of the wedge-clamping device, which is dependent on the sequence in which the wedge elements and intermediate piece are arranged on the coupling piece. On the other hand, this means that with a fixed axial length, the coupling piece in a first arrangement sits radially farther out and, with reversal of the sequence of the radial element and intermediate piece, sits radially farther in. The wedge-clamping device, in a first arrangement, can therefore be used to tighten the coupling piece against the vessel wall and, in a second arrangement, to loosen the coupling piece from the vessel wall. This is especially true when the wedge element in the second arrangement serves to bring the locking device of the coupling piece out of engagement with the container wall.

For this purpose, the wedge element can also be designed symmetrically. In order to be able to use the wedge-clamping device both for tightening and loosening of the clip connection, regardless of the symmetry of the wedge element, it is advantageous if a support surface to support the wedge element and a support surface separate from it (sloping surface for the intermediate piece) are present in the abutment, which is designed, for example, as an annular flange. The support surface and the contact surface can be aligned differently and arranged in different axial positions. This permits the formation of a pocket for at least partial accommodation of the intermediate piece during the loosening process, when the wedge element is pushed directly on the vessel wall into the gap present here between the intermediate piece and the vessel wall. However, if the wedge element is pushed into the gap between the intermediate piece and the abutment, the pocket remains free. The axial length of the wedge-clamping arrangement in the first-named case is to be measured from the bottom of the pocket (contact surface), whereas the axial length of the wedge-clamping device in the second case is to be measured, starting from the support surface of the abutment. While the wedge-clamping device in the latter variant serves for tightening of the connection, in the first variant, in which the intermediate piece is situated in the pocket, it can be used to loosen the clip connection. This is because the wedge elements, without a clamping effect, can be forced radially inward far enough, until their inside surfaces press against the elastic fingers of the locking device and serve as loosening aids.

Both production of the snap connection and its loosening are configured particularly simply in that, in each case, an operating force is applied across the coupling piece of the connection device. No rotational or screw movement is required. The assembly or disassembly processes are correspondingly simple. They can also be carried out reliably without a special tool under tight conditions. Assembly can occur both manually and mechanically. The same applies for disassembly.

A special sealing element appropriate for sealing the connection device according to the invention is advantageously two-armed and has a disk-like arm or section and a tube-like or annular arm or section. The disk-like section serves as a spring device to secure the linear clamping device and additionally for sealing relative to the outside of the container wall. The ring or tube-like section serves for sealing relative to the outside peripheral surface of the coupling piece. The sealing effect occurs under the intrinsic stress of the sealing element. The sealing effect can be secured or improved, if the sealing element is provided with a bulge or sealing lip on its inside peripheral surface.

As an alternative, the sealing element can be molded onto the retaining ring or part of it. It is also possible to provide the retaining ring with a conical inside surface that forces the tubular part of the sealing element radially inward.

Additional details of advantageous variants of the invention are apparent from the drawing, the description or dependent claims.

BRIEF DESCRIPTION OF THE DRAWINGS

Practical examples of the invention are explained in the drawing. In the drawing:

FIG. 2 shows the connection device according to FIG. 1 in the mounted state in a longitudinal cutout, FIG. 3 shows the connection device according to FIG. 1 during loosening of the plug connection in a longitudinal cutout, FIG. 4 shows a connection device according to the invention in its now preferred variant, before tightening, in a partially cutaway side view, FIG. 5 shows the connection device according to FIG. 4 in a front view, FIG. 6 shows the connection device according to FIG. 5 in the mounted state in a partially cutaway side view, FIG. 7 shows a connection device according to FIG. 6 in a front view.

DETAILED DESCRIPTION OF THE INVENTION

Figure 1:
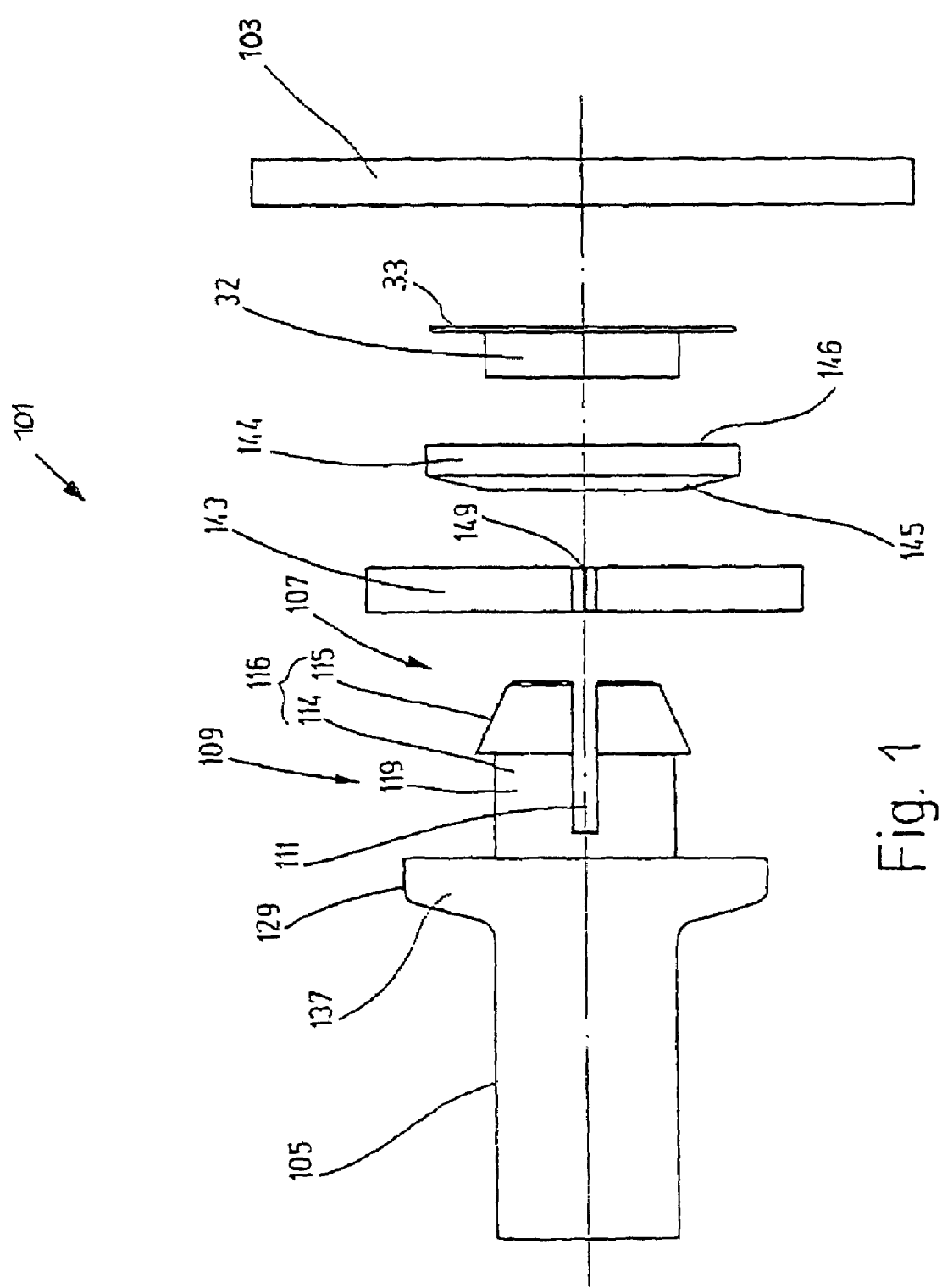
FIG. 1 shows a connection device in a first variant in an exploded view.

A connection device 101 for connection of a line end to the wall 103 of a container 4 is shown in FIG. 1. The connection device 101 has a coupling piece 105 that is designed essentially tubular and defines a fluid channel 106 apparent from FIG. 3. This discharges on one end 107 of the coupling piece 105, which is inserted into an opening 8 (FIG. 2) of the container wall 103.

A head 109 that serves as a plug is formed on the coupling piece 105 on the end. The coupling piece 105, in the region of head 109 shown in FIG. 2, is provided, for example, with four longitudinal slits 111 that extend parallel to the longitudinal axis 112 of the coupling piece 105, starting from end 107.

The wall of the coupling piece 105 forms a free-standing finger 114 (FIG. 3) between each two longitudinal slits 111, which is somewhat flexible according to the material properties of coupling piece 105. The coupling piece 105 preferably consists of a plastic, so that the fingers 114 form elastic tabs. The fingers 114 are each provided on the end 107 with a locking protrusion 115, with which they together form a locking device 116. The locking protrusion 115, as is particularly apparent from FIG. 3, has a conical outer surface 117 on its outside. With its step 118, it turns abruptly into the cylindrical outer surface 119 of the coupling piece 105. A preferably annular flat support surface 121 is formed on step 118, which serves to come into flat contact with the container wall 103 serving as abutment as is apparent from FIG. 1.

The longitudinal slits 111 are preferably formed longer than the locking protrusions 115, referred to the longitudinal direction defined by longitudinal axis 112. The longitudinal slits 111 protrude above the protrusions 115 at most by an amount that corresponds to the thickness of wall 103 of the container. If sufficient flexibility of the fingers 114 cannot be achieved by this, the number of longitudinal slits 111 can be increased. As an alternative measure, weakening regions, in which the thickness of the wall of the coupling piece 105 is reduced and therefore contributes to flexibility in the peripheral direction, can be connected to the longitudinal slits 111. The weakening regions can be formed by recesses that are made in the wall of the coupling piece 105 from the inside. The outer surface 119 preferably remains cylindrical, so as not to hamper sealing of the coupling piece 105 against wall 103.

Figure 8:
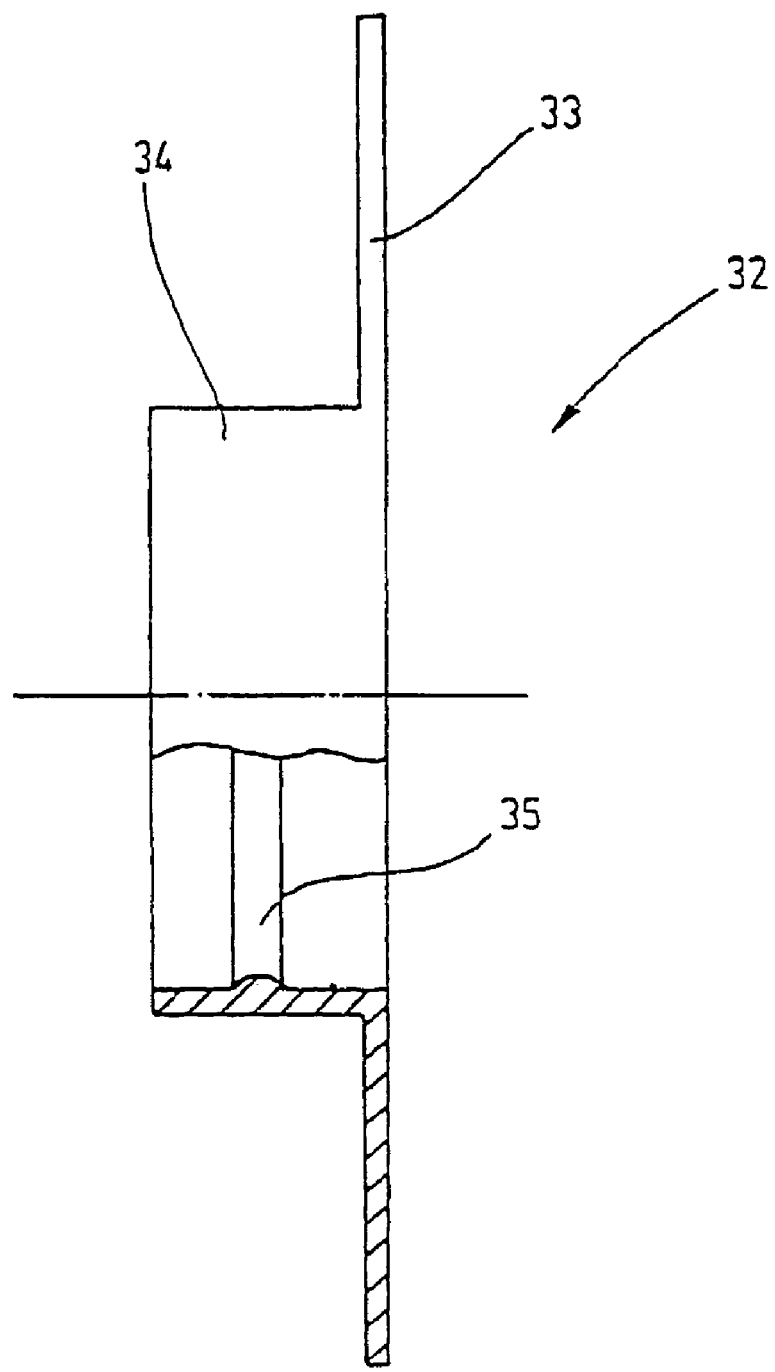
FIG. 8 shows the sealing element in an enlarged, partially cutaway view.

A sealing element 32, consisting of an elastomer material, like rubber, belongs to the connection device 101. As shown in FIG. 1, it can be present as an independent component. The sealing element 32 has a disk-like section 33 that is set up for sealing relative to the outside of wall 103. A pipestub-like section 34 extends away from the disk-like section 33 (FIG. 8), whose inside diameter roughly corresponds to the diameter of the outer surface 119. As shown in FIG. 8, a sealing rib 35 with a semicircular cross section or with a different cross-sectional configuration is provided on the inside of section 34. As an alternative, a sealing lip can be provided. The inside diameter of the sealing rib 35 is somewhat smaller than the diameter of the outside surface 119, so that the sealing rib lies against the outer surface 119 with a bias and therefore seals it.

To produce the connection between the connection device 101 and the container 4, a clamping device 123 is provided in the connection device 101, which is designed as a wedge-clamping device. The coupling piece 105 has an annular flange 137 as abutment 129 for the clamping device 123, which can be molded as one piece onto the coupling piece 105. The annular flange 137 is provided with an annular support surface 138 on its side facing wall 103 which is designed as a flat surface and can be arranged on the radially outer edge of the annular flange 137. The end surface of the annular flange 137, in its connection to the support surface 138, can grade into a sloping surface 139, in order to form an annular picket 141.

A wedge arrangement 143 and a retaining ring 144 belong to the clamping device 123. This is mounted axially displaceable on the outer surface 119 of coupling piece 105. FIG. 4 shows the retaining ring 144 separately. As is apparent, it has a conical surface 145 on its side facing the annular flange 137 and a flat annular surface 146 on its opposite side.

Two arc-like wedge elements 147, 148 that are connected to each other by a film hinge 149 or other hinge element belong to the wedge arrangement 143.

The wedge elements 143 have a conical surface 151 serving as wedge surface on their side facing the retaining ring 144. They are designed flat on the opposite side. The axial thickness of each wedge element 147, 148 therefore diminishes from a radially outer position to a radially inner position. The slope of the conical surface 151 then agrees with the slope of conical surface 145.

The connection device 101 described to this extent functions as follows:

To produce the connection, at least the retaining ring 144 and the sealing element 132 are pushed onto the head 109 initially. Head 109 is then locked onto opening 8, in which the wall of opening 8, whose diameter is less than the outside diameter of head 109, forces the fingers 114 together somewhat during the insertion process. As soon as the protrusions 115 have passed through opening 8, the fingers 114 snap away from each other again, so that the locking device 116 engages behind wall 103.

The wedge arrangement 143 is now used to secure the connection. For this purpose, the wedge elements 147, 148 are pivoted relative to each other, so that they enter the intermediate space formed between the annular flange 137 and the retaining ring 144. If the wedge elements 147, 148 are moved continually inward, they force the retaining ring 144 against the sealing element 32 and wall 33. Because of this, the connection device 101 is secured. When this state is reached, the wedge elements 147, 148 can be secured in their position, for example, by an appropriate means of locking. Adhesives, force-fitting devices, adhesive tape, a clamping band or the like can be used for this.

As is also apparent from FIG. 2, the connection device 101 can also be used on containers with differently thick walls 103. The only essential criterion is initially that the slits 111 do not protrude above the sealing rib 135. Wall thickness differences can be compensated by forcing the wedge elements 147, 148 into the gap between annular flange 137 and retaining ring 144 by a greater or lesser distance.

The connection device 101 described here is releasable. If the connection is to be loosened, the wedge elements 147, 148 are initially loosened and pivoted outward, so that they can be removed. In the second step, the connection piece 105 is pushed into the container 4, so that the wall 103 pushes the retaining ring 144 against annular flange 137. The retaining ring 144 is then situated in pocket 141.

In the next step, the coupling piece 105 is pulled back again slightly, so that a gap forms between the retaining ring 144 and wall 103. As shown in FIG. 3, the wedge arrangement 143 that was turned in the meantime is now inserted into this gap. The retaining ring 144 is accommodated at least partly by pocket 141, so that the wedge elements 147, 148 are now in the gap between the retaining ring 144 and wall 103 without axially tightening the coupling piece 105. The wedge elements 147, 148 can be pushed far enough into the gap on this account that their inside peripheral surfaces come in contact with the outer surface 119 of head 109. By exerting a sufficient force F (arrows in FIG. 3) on wedge elements 147, 148, the fingers 114, as indicated by the small arrows in FIG. 3, can be moved toward each other. The locking protrusion 115 are shifted inward by this and expose opening 8. The coupling piece 105 can be removed from opening 8.

FIGS. 4 to 6 show another modified variant of a connection device 201. If design or functional agreement exists with the variant according to FIGS. 1 to 3, their reference numbers are used, increased by 100. The aforementioned part of the description is referred to accordingly for explanation.

In contrast to the variant according to FIGS. 1 to 3, the connection device 201 has a connection piece 205 with a straight annular flange 237. Its side facing wall 103 of container 4 is designed flat. The wedge-clamping device 242, as in the practical example just described, serves to tighten the connection device 201. As shown in FIG. 4, the wedge elements 247, 248 are again connected to each other via a film hinge 249. A locking device 253 is additionally provided for connection of the wedge elements 247, 248 to each other, to which a locking finger 254 and a locking tab 255 belong. While the locking finger 254 is formed on the wedge element 247, the locking tab 255 is arranged on the arc-like wedge element 248. The locking finger 254 is arranged on the end of the wedge element 247 opposite the film hinge device 249 and extends away from this end in the peripheral direction. The locking finger 254 is provided with toothing on its inside that matches the locking tab 255. This type of locking device, if necessary, can also be provided on the connection device 101.

The connection device 201 shown in FIGS. 4 to 6 functions as follows:

After insertion of head 209 into opening 8, the retaining ring 244, as is apparent in FIG. 7, is pushed against wall 103. The wedge arrangement 243, as is apparent from FIG. 8, is engaged so that the wedge elements 247, 248 fit into the gap between the retaining ring 244 and the annular flange 237. To tighten the connection device 201, the wedge elements 247, 248 are now pivoted toward each other, so that ultimately they reach the position shown in FIGS. 9 and 10. The retaining ring 244 is pushed away from the annular flange 237 and clamps the wall 103 between the retaining ring 244 and the locking protrusions 215. The sealing element 32 is also clamped between the retaining ring 244 and wall 103.

The wedge elements 247, 248, if the fixed position is already reached, can remain in this position before the wedge elements 247, 248 encounter each other with their ends. In the ideal case, however, the position shown in FIG. 10 is reached, in which the connection device 201 is fixed and tilt-proof. The fluid channel 206 is therefore in fluid connection with the interior of container 4. The connection is fluid-tight, vibration-proof and permanently secure. Lines can be connected with the connection device 101 or 201 both to container walls and to container bottoms. If a bottom outlet is to be achieved with the connection device, for example, the slits 111, 211 permit complete discharge of the liquid contained in container 4 through the connection device, although head 109 or 209 extends somewhat into the interior of the container 4.

The connection device 101, 201 according to the invention has a locking head 109, 209 that can be locked to an opening 8 of a container wall 103. A clamping device 123, 223 is also provided on the corresponding coupling piece 5, which is used to tighten the head 109, 209 locked to the container wall 103 without using a rotational movement. The clamping device 123, 223 can be designed as a wedge-clamping device 142, 242. The latter permits creation of large clamping forces with small operating forces. The clamping device 142, 242 is preferably secure by a locking device 253, so that a vibration-proof connection resistant to temperature changes is achieved with simple assembly.

What is claimed is:

1. A fluid connection device for a container having a container wall, the fluid connection device comprising:
 a coupling piece having a fluid channel that discharges into the container, the coupling piece including a locking device for engaging the container wall and a flange;
 a clamping device configured to secure the coupling piece to the container wall, the clamping device including a pair of generally arc-shaped wedge elements connected to each other via a hinge, the wedge elements including a wedge surface adapted to move the coupling piece away from the container wall when the wedge elements are positioned between the flange on the coupling piece and the container wall; and
 a sealing element for inhibiting fluid leakage between the container wall and the fluid connection device.

2. The connection device according to claim 1 further including a retaining ring, the wedge elements positioned between the flange on the coupling piece and the retaining ring in a first configuration and between the container wall and the retaining ring in a second configuration.

3. A connection device for fluid-conducting equipment, the connection device comprising:
 a coupling piece having a fluid channel that discharges on an end of the coupling piece, the end of the coupling piece including a locking device;
 a clamping device configured to clamp the locking device against an abutment in an axial direction, the clamping device including a wedge-clamping device with two generally arc-shaped wedge elements that are connected to each other via a binge device and are introduced between a protrusion on the coupling piece and the abutment, the wedge elements including a support surface and a wedge surface adapted to wove the coupling piece away from the abutment, the clamping device having a first configuration in which the wedge elements are positioned to clamp the locking device against an abutment and a second configuration in which the wedge elements are positioned to release the locking device from the abutment; and
 a sealing element for sealing the fluid channel against the abutment.

4. The connection device according to claim 3 wherein the generally arc-shaped wedge elements are adapted to be connected to each other via a locking device.

* * * * *